ations, and is particularly directed to a new and improved mount for supporting an outrigger fishing pole.

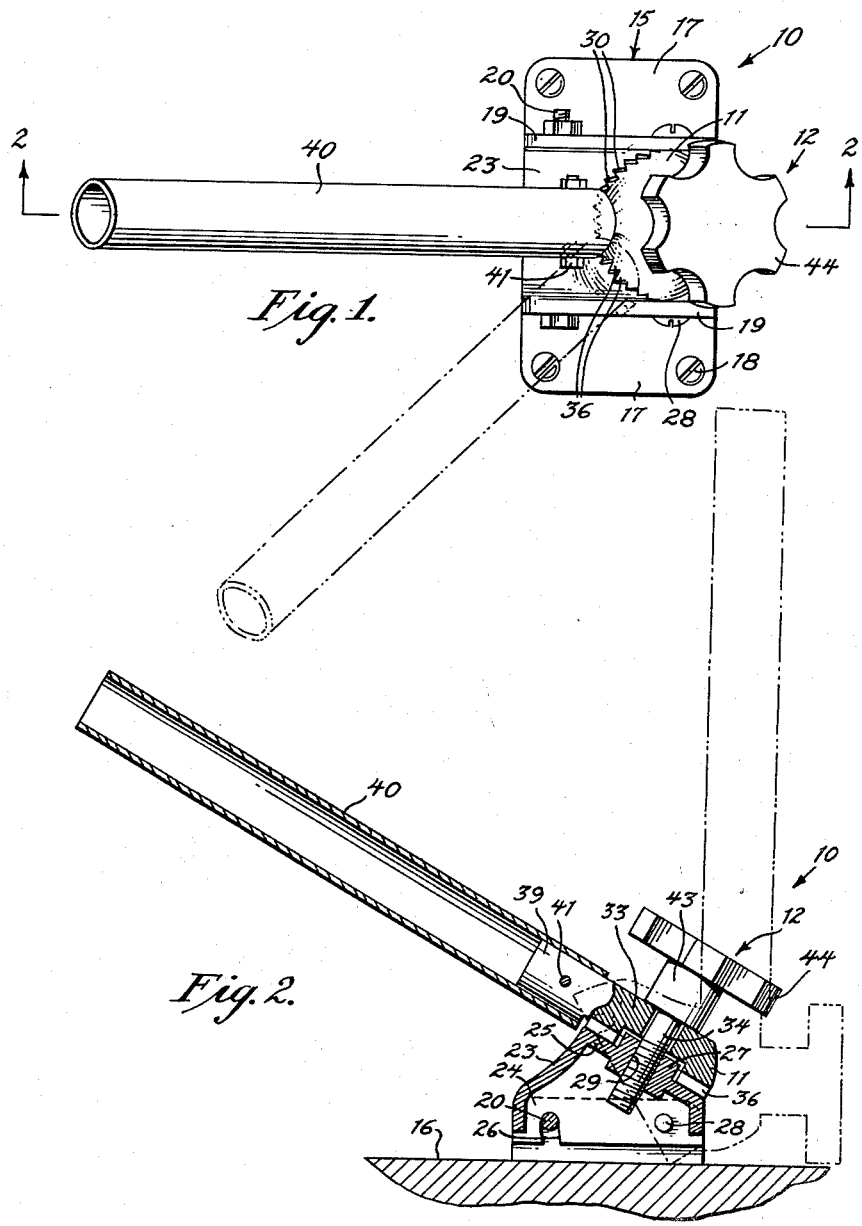

United States Patent Office 2,958,491
Patented Nov. 1, 1960

2,958,491

OUTRIGGER FISHING POLE SUPPORTS

Thomas Ackley, Philadelphia, Pa., assignor to John J. Donovan, Newtown Square, Pa.

Original application May 28, 1956, Ser. No. 587,587, now Patent No. 2,898,065, dated Aug. 4, 1959. Divided and this application Nov. 7, 1958, Ser. No. 773,134

2 Claims. (Cl. 248—42)

This invention relates generally to fishing appliances, and is particularly directed to a new and improved mount for supporting an outrigger fishing pole.

The particular embodiment of the present invention, which is illustrated in the drawings and which will be described hereinafter in greater detail, comprises generally a supporting bracket, a carrier rotatably received in the bracket, means for locking the carrier against rotation, and pole-holding means carried by the carrier.

It is a general object of the present invention to provide an outrigger fishing pole mount of the type described which is extremely simple and durable in construction, and reliable in use, which can be easily installed and maintained, quickly adjusted to any desired position, and is capable of manufacture and sale at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a top plan view showing an outrigger fishing pole mount constructed in accordance with the present invention and illustrating an alternate position of rotation in dot-and-dash outline; and Figure 2 is a sectional view taken substantially along the line 2—2 of Figure 1, and showing the mount in dot-and-dash outline in an upstanding, nonuse position.

Referring now more particularly to the drawings, and specifically to Figures 1 and 2 thereof, the embodiment of the invention illustrated therein comprises a bracket generally designated 10, a carrier 11 movably mounted on the bracket, and retaining means 12 for securing the carrier in any selected position of movement relative to the bracket.

The bracket 10 includes a base 15 adapted to be secured fast to an upwardly facing supporting surface 16, see Figure 2. The base 15 is composed of a pair of laterally spaced angle members or side pieces 17, 17, each having a generally horizontal portion secured in facing engagement with the supporting surface 16, as by screws or other suitable fasteners 18. Further, the angle members or side pieces 17 are formed on their inner edges with upstanding walls or flanges 19, 19 disposed in parallel spaced, facing relation with respect to each other. A tie bolt or rod 20 extends generally horizontally between and has its opposite ends secured in respective walls 19.

Located in the space between the side pieces 17 of the bracket base 15 is an intermediate bracket member or body 23. As best seen in Figure 2, the bracket member 23 is of generally horizontally disposed in its normal, solid-line position, and of substantially hollow internal construction, opening downwards toward and spaced from the supporting surface 16. More particularly, the hollow bracket body 23 includes a pair of laterally spaced, generally parallel side walls 24 each disposed contiguous to a respective upstanding wall 19 of the adjacent side piece 17. The upper wall of the hollow bracket member 23 is specifically configured to define a generally circular portion 25 disposed at an inclination when the bracket member is in its generally horizontal, normal position. A pair of generally horizontally aligned pivotal fasteners or pins 28, 28 are located in parallelism with the tie bolt 20 and each extends through an adjacent side-piece wall 19 and the bracket-body wall 24 to mount the bracket body 23 in the space between the bracket side pieces 17 for limited rotation about the axis of pins 28 between the generally horizontal, normal, solid-line position and the upstanding position of nonuse, shown in dot-and-dash outline. The opposite bracket-body side walls 24, as seen in Figure 2, are each provided with a downwardly opening notch or slot 26 for receiving the adjacent portion of bolt 20 and thus supporting the bracket member in its normal position.

Centrally of the inclined, circular upper bracket member wall portion 25, on the exterior thereof, is formed an annular boss 27, which is provided with an internally threaded, central bore or hole 29 extending generally normal to the plane of the inclined wall portion 25 and opening inwards through the latter wall portion to the interior of the bracket member.

On the outer surface of the inclined bracket member wall portion 25, arranged about the central boss 27 and hole 29, are formed a plurality of upstanding teeth, serrations or locking elements 30. In particular, the locking elements or serrations 30 extend generally radially of the bore 29, and are defined by a plurality of radially extending notches or grooves arranged circumferentially about the generally circular top-wall portion 25.

The carrier 11 includes a centrally apertured disc-shaped member 33 seated on the upper side of the circular top bracket member wall portion 25 and extending about the hole or bore 29. An elongate member, rod or shank 34 extends rotatably through the center of the carrier member 33 and into the hole 29. On its underside the carrier member 33 is formed with a central, circular recess adapted to spacedly receive the bracket-member boss 27, and is further formed on its underside with a plurality of circumferentially arranged, radially extending locking elements, teeth or serrations 36 adapted for interlocking engagement with the teeth 30 of the bracket-member top wall 25.

A stud or lug 39 projects generally radially outward from the carrier member 33 and extends into one end of a pole-holding tube 40, wherein the lug is fixedly secured by a pin or bolt 41. As best seen in Figure 2, the stud or lug 39 projects generally radially from the carrier member 33 so as to be disposed at substantially the same inclination as the latter; and, the pole-holding tube 40 receives and is in substantial alignment with the lug 39 so as to be also inclined in its normal position.

The shank or rod 34 of the carrier 11 has its lower portion threaded for threaded engagement with the interior of the bore 29; and, is provided on its upper end, above the member 33, with an enlarged retaining head 43 and a manually actuable knob 44. The shank or rod 34 and head 43, which combine to define a threaded fastener, are thus movable longitudinally in the bore 29, by the threaded engagement therein, so that the head 43 is movable downward into engagement with the upper side of the carrier member 33 to clamp the latter against the bracket member 23, and movable upwards to release the carrier member from its clamped condition. That is, when the retaining head 43 is moved downwards, to the position of Figure 2, the interengageable teeth or serrations 30 and 36 are in their interlocking engagement, so that the carrier member 33 and pole holder 40 are locked in position. However, when the retaining head 43 is moved upwards, by rotation of the rod 34, the carrier member 33 may move upwards to withdraw the serrations 30 and 36 from their interengaging relation and permit rotation of the carrier member and pole holder about the axis of the rod 34 to any selected position. The rod 34 and retaining head 43 may then be screwed down to lock the carrier member 33 in the selected position of rotation.

In use, a fishing pole is inserted into the outer end of the tube 40, and retained therein by line or other suitable means. The angular disposition of the tube 40 and fishing pole may be selectively adjusted to any position of rotation about the axis of rod 34, and locked in its selected position of rotation, by sufficient upward withdrawal and downward replacement of the rod 34 and retaining head 43, as described hereinbefore. Further, when it is desired to bring the outwardly projecting fishing poles in-board, say when passing through a narrow space, or for any other reason, it is only necessary to swing the bracket member 23 about its pivotal axis defined by the pins 28 to the upstanding nonuse position. The carrier 11 and pole holder 40 will thereby be swung to a substantially upright position.

From the foregoing, it is seen that the present invention provides a mount for an outrigger fishing pole which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

This application is a division of application Serial No. 587,587, filed May 28, 1956, now Patent No. 2,898,065.

What is claimed is:

1. An outrigger fishing pole mount comprising a pair of laterally spaced upstanding base walls adapted to be fixed on an upwardly facing surface, generally horizontal pivot means carried by said base walls at one end thereof, a support member fixed between said base walls at the other end thereof, a bracket member located between said base walls and mounted on said pivot means for swinging movement between a generally horizontal normal position resting on said support member and an upstanding nonuse position away from said support member, said bracket member being formed with an internally threaded hole opening generally obliquely upward away from said support member when said bracket member is in normal position and extending generally horizontal when said bracket member is in said nonuse position, a carrier member seated on said bracket member extending about said hole, a pole holder projecting from said carrier member in a plane normal to said hole, and a headed fastener extending through said bracket-member hole to support said carrier member for rotation relative to said bracket member, said fastener being movable longitudinally in said bracket-member hole to releasably clamp said carrier member against said bracket member in any selected position of carrier-member rotation.

2. An outrigger fishing pole mount accounding to claim 1, in combination with interengageable serrations on the seating faces of said bracket and carrier members for positively locking the latter in any selected position of rotation.

References Cited in the file of this patent
UNITED STATES PATENTS

| | | |
|---|---|---|
| 2,176,352 | McHuron | Oct. 17, 1939 |
| 2,599,160 | Brauer | June 3, 1952 |
| 2,734,555 | Kroner | Feb. 14, 1956 |